(12) United States Patent
Rangarajan et al.

(10) Patent No.: US 9,819,643 B2
(45) Date of Patent: Nov. 14, 2017

(54) CCN NAME PATTERNS

(71) Applicant: Telefonaktiebolaget L M Ericsson (publ), Stockholm (SE)

(72) Inventors: Hari Rangarajan, San Jose, CA (US); Yvan Royon, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 385 days.

(21) Appl. No.: 14/513,100

(22) Filed: Oct. 13, 2014

(65) Prior Publication Data
US 2016/0105394 A1    Apr. 14, 2016

(51) Int. Cl.
*H04L 29/12* (2006.01)
*H04L 29/08* (2006.01)

(52) U.S. Cl.
CPC ........ *H04L 61/302* (2013.01); *H04L 67/2842* (2013.01); *H04L 67/327* (2013.01)

(58) Field of Classification Search
CPC .................................................... H04L 61/302
See application file for complete search history.

(56) References Cited

U.S. PATENT DOCUMENTS

| | | | | |
|---|---|---|---|---|
| 2007/0143242 A1* | 6/2007 | Miller | ............... | G06F 17/30902 |
| 2009/0287835 A1* | 11/2009 | Jacobson | ............. | H04L 67/104 |
| | | | | 709/229 |
| 2011/0185016 A1* | 7/2011 | Kandasamy | .......... | G06Q 30/02 |
| | | | | 709/203 |
| 2012/0327931 A1 | 12/2012 | Esteban et al. | | |
| 2014/0201374 A1* | 7/2014 | Ashwood-Smith | ..... | H04L 49/70 |
| | | | | 709/226 |
| 2015/0271267 A1* | 9/2015 | Solis | ................. | G06F 17/30174 |
| | | | | 709/213 |

FOREIGN PATENT DOCUMENTS

EP    2214357 A1    8/2010

OTHER PUBLICATIONS

"Transmission Control Protocol; DARPA Internet Program; Protocol Specification", RFC 793; Sep. 1981; 85 pages.

(Continued)

*Primary Examiner* — Vivek Srivastava
*Assistant Examiner* — Nicholas Celani
(74) *Attorney, Agent, or Firm* — Nicholson De Vos Webster & Elliott, LLP

(57) ABSTRACT

A method is implemented by a content centric network (CCN) naming layer executed by a network device. The naming layer is configured to enable processing of regular expressions as part of a hierarchical CCN name, where regular expressions are sequences of characters that form a search pattern. The method processes regular expressions utilized in a one to many scenario between a plurality of CCN clients and at least one CCN serving node. The method includes receiving a CCN interest from a CCN forwarding layer, accessing a forwarding information base (FIB) to find FIB entries matching a path of the CCN name and the regular expression, accessing a content store to find content objects matching the FIB entries, and creating a new CCN interest for each of the FIB entries not found in the content store.

15 Claims, 10 Drawing Sheets

(56) References Cited

OTHER PUBLICATIONS

Ali, Z., et al., "Node-IDS Based Resrouce Reservation Protocol (RSVP) Hello: A Clarification Statement", *Network Working Group*; RFC 4558; Jun. 2006; 7 pages.
Andersson, L., et al., "LDP Specification", *Network Working Group*; RFC 5036; Oct. 2007, 135 pages.
Awduche, D., et al., ""RSVP-TE: Extensions to RSVP for LSP Tunnels,"", *Network Working Group*; RFC 3209; Dec. 2001; 61 pages.
Babiarz, J., et al., "Configuration Guidelines for DiffServ Service Classes", *Network Working Group, Request for Comments: 4594, The Internet Society*, (Aug. 2006), 57 pages.
Baker, F., et al., "A Differentiated Services Code Point (DSCP) for Capacity-Admitted Traffic", *Internet Engineering Task Force* (IETF); RFC 5865; May 2010; 14 pages.
Baker, F., et al., "Management Information Base for the Differentiated Services Architecture", *Network Working Group*, Request for Comment: 3289, May 2002, 116 pages.
Berger, L. "Generalized Multi-Protocol Label Switching (GMPLS) Signaling Resource ReserVation Protocol-Traffic Engineering (RSVP-TE)", *Network Working Group*; RFC 3473; Jan. 2003; 42 pages.
Bernet, Y., et al., "An Informal Management Model for Diffserv Routers", *Network Working Group, Request for Comments: 3290, The Internet Society*, (May 2002), 56 pages.
Black, D., et al., "*Per Hop Behavior Identification Codes,*" Jun. 2001, 8 pages, *Network Working Group, Request for Comments: 3140, The Internet Society*.
Black, D., "*Differentiated Services and Tunnels,*" Oct. 2000, 14 pages, *Network Working Group, Request for Comments: 2983, The Internet Society*.
Blake, S., et al., "An Architecture for Differentiated Services", Dec. 1998, 36 pages, *Network Working Group, Request for Comments: 2475, The Internet Society*.
Borman, D., et al., "IPv6 Jumbograms", *Network Working Group*, Request for Comments: 2675, Aug. 1999, 9 pages.
Braden, R., et al., ""Resource ReSerVation Protocol (RSVP)—Version 1 Functional Specification,"", *Network Working Group*, RFC 2205; Sep. 2007; 112 pages.
Chan, K., et al., "Differentiated Services Quality of Service Policy Information Base", *Network Working Group, Request for Comments: 3317, The Internet Society*, (Mar. 2003), 96 pages.
Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.
Coltun, R., et al., "OSPF for IPv6", *Network Working Group*, Request for Comments: 5340, Jul. 2008, 95 pages.
Davie, B., et al., "An Expedited Forwarding PHB (Per-Hop Behavior)", *Network Working Group, Request for Comments: 3246, The Internet Society*, (Mar. 2002), 16 pages.
Deering, et al., "Internet Protocol", *IETF* RFC 2460, version 6 (IPv6) Specification, Dec. 1998, 37 pages, http://www.ietf.org/rfc/rfc2460.txt.
Eggert, L., et al., "Unicast UDP Usage Guidelines for Application Designers", *Network Working Group, Request for Comments: 5405, IETF Trust*, (Nov. 2008), 27 pages.
Fenner, B., et al., "Management Information Base for the User Datagram Protocol (UDP)", *Network Working Group, Request for Comments: 4113, The Internet Society*, (Jun. 2005), 19 pages.
Grossman, D., "New Terminology and Clarifications for Diffserv", *Network Working Group*; RFC 3260; Apr. 2002; 10 pages.

Hedrick, C., "Routing Information Protocol", *Network Working Group*; RFC 1058; Jun. 1988; 33 pages.
Heinanen, J., et al., "Assured Forwarding PHB Group", Jun. 1999, 11 pages, *Network Working Group, Request for Comments: 2597, The Internet Society*.
Housley, "Using Advanced Encryption Standard (AES) CCM Mode with IPsec Encapsulating Security Payload (ESP)", *Network Working Group, Request for Comments: 4309, The Internet Society*, (Dec. 2005), 13 pages.
Kent, et al., "Security Architecture for the Internet Protocol", *Network Working Group, Request for Comments: 4301, The Internet Society*, (Dec. 2005), 101 pages.
Kompella, K., et al., "Procedures for Modifying the Resource reSerVation Protocol (RSVP)", *Network Working Group*; RFC 3936; Oct. 2004; 7 pages.
Malkin, G., "RIP Version 2", *Network Working Group*, Request for Comments: 2453, Nov. 1998, 40 pages.
Malkin, G., et al., "RIPng for IPv6", *Network Working Group*; RFC 2080; Jan. 1997; 19 pages.
Moy, J., ""OSPF Version 2,"", Apr. 1998, 244 pages, *Network Working Group, Request for Comments 2328, The Internet Society*.
Nichols, K., et al., "*Definition of Differentiated Services Per Domain Behaviors and Rules for their Specification,*" Apr. 2001, 24 pages, *Network Working Group, Request for Comments: 3086, The Internet Society*.
Nichols, K., et al., "*Definition of the Differentiated Services Field (DS Field) in the IPv4 and IPv6 Headers,*" Dec. 1998, 20 pages, *Network Working Group, Request for Comments: 2474, The Internet Society*.
Oran, David, "OSI ISIS Intra-domain Routing Protocol", *Network Working Group*, Request for Comments: 1142, Feb. 1990, 206 pages.
Polk, J., et al., "A Resource Reservation Protocol (RSVP) Extension for the Reduction of Bandwidth of a Reservation Flow", *Network Working Group*; RFC 4495; May 2006, 21 pages.
Postel, J., ""User Datagram Protocol","", *STD* 6, RFC 768, Aug. 1980.
Rekhter, Y., et al., ""A Border Gateway Protocol 4 (BGP-4)","", RFC 4271, Jan. 2006.
Rosen, et al., *Network Working Group; RFC 4364; ;BGP/MPLS IP Virtual Private Networks* (VPNs), *copyright The Internet Society* (2006); Feb. 2006; 47 pgs.
Shenker, S., et al., "Specification of Guaranteed Quality of Services", *Network Working Group*; RFC 2212; Sep. 1997; 20 pages.
Socolofsky, T., et al., "A TCP/IP Tutorial", *Network Working Group*, Request for Comments: 1180, (Jan. 1991), 28 pages.
Wroclawski, J., "Specification of the Controlled-Load Network Element Service", *Network Working Group*; RFC 2211; Sep. 1997; 19 pages.
Wroclawski, J., "The Use of RSVP with IETF Integrated Services", *Network Working Group*; RFC 2210; Sep. 1997; 33 pages.
Goergen, et al., "A Semantic Firewall for Content-Centric Networking," 2013 IFIP/IEEE International Symposium on Integrated Network Management (IM 2013), May 27, 2013, pp. 478-484.
Jacobson, et al., "Networking Named Content," CoNEXT '09, 5th International Conf. on Emerging Networking Experiments and Technologies, Dec. 1-4, 2009, 12 pages.
Tschudin, 'The "Named Function Networking" project,' downloaded via Internet Archive on Apr. 15, 2016 http://www.named-function.net/, as published Sep. 4, 2014 at 1 page.
U.S. Appl. No. 14/667,545, pending.
Mosko, Marc, "CCNx 1.0 Protocol Specification Roadmap", *PARC*; Apr. 14, 2014 (rev 3); 4 pages.
Mosko, Marc, "Labeled Segment UIs ccnx-mosko-labeledsegments-01", *IETF*; http://www.ccnx.org/pubs/ccns-mosko-labeledsegments-01.txt; Jul. 20, 2014; 12 pages.

\* cited by examiner

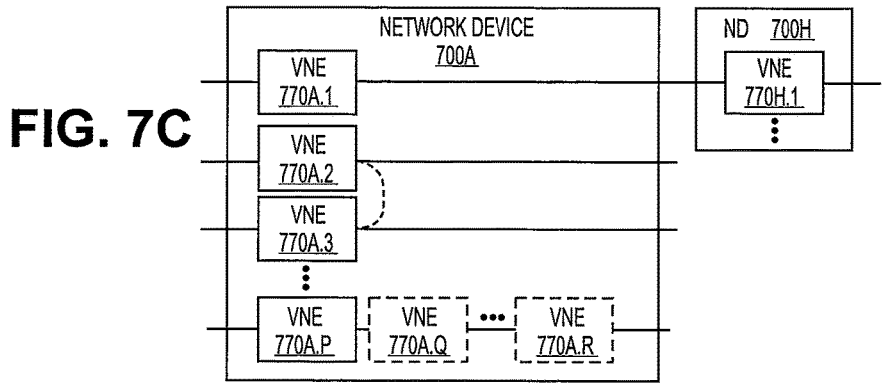
FIG. 7C
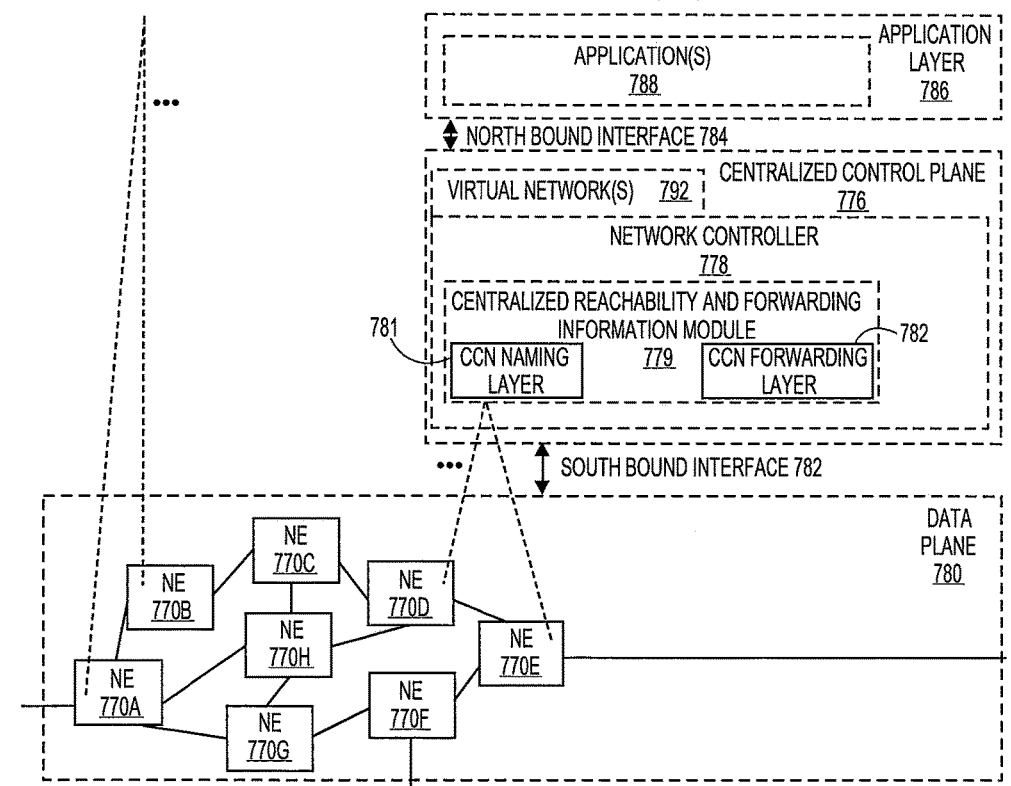
FIG. 7D
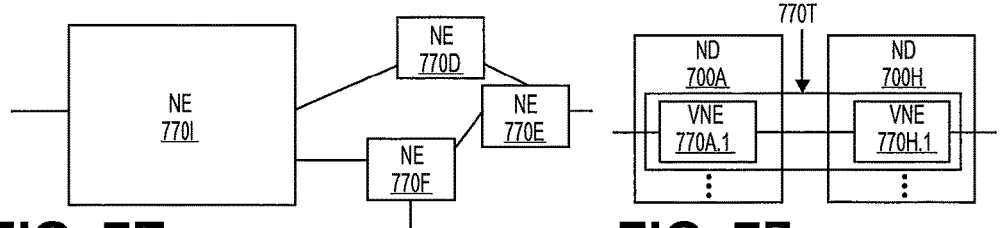
FIG. 7E
FIG. 7F

CCN NAME PATTERNS

FIELD

Embodiments of the invention relate to handling of hierarchical names for information centric networks (ICN). Specifically, the embodiments relate to a method for handling regular expressions in hierarchical names in queries such as in content centric network (CCN) interests.

BACKGROUND

An ICN is a conceptualization of networking protocol stack, in particular layers 3 and above of a network protocol stack. A CCN is a particular architecture and implementation of an ICN. ICNs and CCNs are based on the premise of naming resources in these networks. In particular the naming relates to the use of a globally shared namespace for objects that allows entities in these networks to retrieve any content of interest.

Thus, with a CCN a name is utilized to identify a content object instead of an Internet Protocol (IP) address of the content or a host of the content. In an IP network, routing is based on host names (e.g., source and destination addresses). In a CCN by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN respond with a content object identified by a CCN name in the CCN interest. These CCN content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

Using the naming conventions of CCN, one name identifies one content object. If a CCN client requires multiple content objects, then multiple corresponding CCN interests must be generated and sent. CCN does not provide convenient functions to facilitate the retrieval of content objects using their content names. For example, CCN clients cannot name a collection of content objects. If a group of related content objects are required, then the CCN client must send a separate CCN interest for each content object.

SUMMARY

A method is implemented by a content centric network (CCN) naming layer executed by a network device. The naming layer is configured to enable processing of regular expressions as part of a hierarchical CCN name, where regular expressions are sequences of characters that form a search pattern. The method processes regular expressions utilized in a one to many scenario between a plurality of CCN clients and at least one CCN serving node. The method includes receiving a CCN interest from a CCN forwarding layer, accessing a forwarding information base (FIB) to find FIB entries matching a path of the CCN name and the regular expression, accessing a content store to find content objects matching the FIB entries, and creating a new CCN interest for each of the FIB entries not found in the content store.

A network device to execute a method for enabling processing of regular expressions as part of a hierarchical CCN name, where regular expressions are sequences of characters that form a search pattern. The method processes regular expressions utilized in a one to many scenario between a plurality of CCN clients and at least one CCN serving node. The network device includes a non-transitory machine-readable storage medium configured to store a CCN forwarding layer and a CCN naming layer, and a network processor communicatively coupled to the non-transitory machine-readable storage medium. The network processor is configured to execute the CCN forwarding layer and the CCN naming layer. The CCN Naming layer is configured to receive a CCN interest from the CCN forwarding layer, to access a forwarding information base (FIB) to find FIB entries matching a path of the CCN name and the regular expression, to access a content store to find content objects matching the FIB entries, and to create a new CCN interest for each of the FIB entries not found in the content store.

A computing device executing a plurality of virtual machines for implementing network function virtualization (NFV), wherein a virtual machine from the plurality of virtual machines is configured to execute a method for enabling processing of regular expressions as part of a hierarchical CCN name, where regular expressions are sequences of characters that form a search pattern. The method processes regular expressions utilized in a one to many scenario between a plurality of CCN clients and at least one CCN serving node. The computing device includes a non-transitory machine-readable storage medium configured to store a CCN forwarding layer and a CCN naming layer, and a processor communicatively coupled to the non-transitory machine-readable storage medium. The processor is configured to execute the CCN forwarding layer and the CCN naming layer. The CCN Naming layer is configured to receive a CCN interest from the CCN forwarding layer, to access a forwarding information base (FIB) to find FIB entries matching a path of the CCN name and the regular expression, to access a content store to find content objects matching the FIB entries, and to create a new CCN interest for each of the FIB entries not found in the content store.

A control plane device is configured to implement at least one centralized control plane for a software defined network (SDN). The centralized control plane is configured to execute a method for enabling processing of regular expressions as part of a hierarchical CCN name, where regular expressions are sequences of characters that form a search pattern. The method to process regular expressions is utilized in a one to many scenario between a plurality of CCN clients and at least one CCN serving node. The computing device is a non-transitory machine-readable storage medium configured to store a CCN forwarding layer and a CCN naming layer, and a processor communicatively coupled to the non-transitory machine-readable storage medium. The processor is configured to execute the CCN forwarding layer and the CCN naming layer. The CCN Naming layer is configured to receive a CCN interest from the CCN forwarding layer, to access a forwarding information base (FIB) to find FIB entries matching a path of the CCN name and the regular expression, to access a content store to find content objects matching the FIB entries, and to create a new CCN interest for each of the FIB entries not found in the content store.

BRIEF DESCRIPTION OF THE DRAWINGS

The invention may best be understood by referring to the following description and accompanying drawings that are used to illustrate embodiments of the invention. In the drawings:

FIG. 7C illustrates various exemplary ways in which virtual network elements (VNEs) may be coupled according to some embodiments of the invention.

FIG. 7D illustrates a network with a single network element (NE) on each of the NDs of FIG. 7A.

FIG. 7E illustrates an example where each of the NDs implements a single NE (see FIG. 7D), but the centralized control plane has abstracted multiple of the NEs in different NDs into a single NE in one of the virtual network(s) of FIG. 7D, according to some embodiments of the invention.

FIG. 7F illustrates a case where multiple VNEs are implemented on different NDs and are coupled to each other, and where the centralized control plane has abstracted these multiple VNEs such that they appear as a single VNE within one of the virtual networks of FIG. 7D, according to some embodiments of the invention.

DETAILED DESCRIPTION

Figure 1:
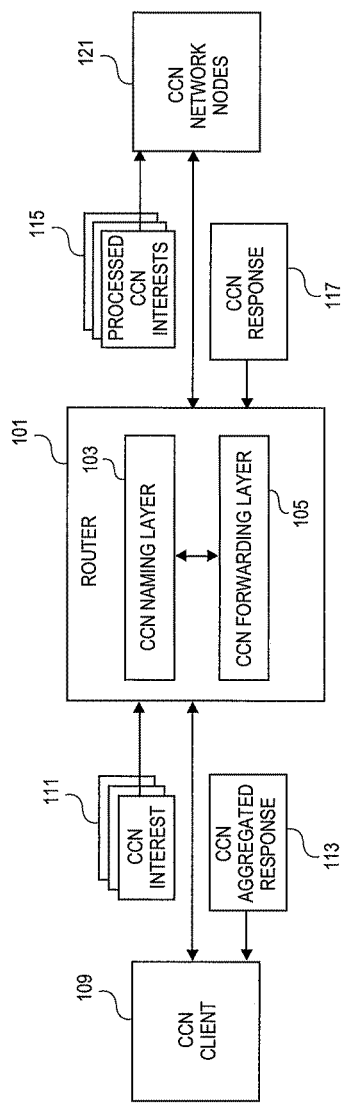
FIG. 1 is a diagram of one embodiment of an example network in which support for regular expressions in hierarchical naming is implemented.

The following description describes methods and apparatus for implementing support for regular expressions in information centric networks such as content centric networks (CCN). Support of processing regular expressions includes tracking and caching to enable CCN interests It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Examples provided herein are with relation to a CCN, however, one skilled in the art would understand that the principles and structures described herein are also applicable to other ICNs that utilize a hierarchical naming model. The implementation of the processes, functions and architecture are described with regard to CCN by way of example rather than limitation.

The CCN architecture and implementation is based on a receiver-initiated data flow model. CCN clients send CCN interest packets to the CCN network nodes to request content objects and data containers. The CCN node functioning as the original content object provider or any node (e.g., a router) in the CCN that has a cached copy of the content object can respond to the CCN interest with a CCN response containing the requested content object.

This model of communication can be referred to as a many-to-one retrieval. Many CCN clients can request the same piece of data (e.g., a content object) from a single original CCN provider. The CCN nodes are optimized in the embodiments described herein to service and aggregate requests and by caching content objects for servicing CCN interests.

The embodiments expand on the CCN functionality and design by adding support for applications that follow a one-to-many data retrieval model. With a one-to-many data retrieval model CCN is expanded to enable a CCN client to send a single CCN interest for a set of content objects rather than having to send a separate CCN interest for each requested content object. A 'set,' as used herein refers to any positive whole number of items including one item. CCN is also expanded to improve caching such that it supports these queries and if other CCN clients are interested in the same set of data or a subset of the data this data can be retrieved from the cache. The expansion of the CCN to support one-to-many data retrieval in combination with many-to-one data retrieval, many-to-many communications are thereby inherently supported.

In some embodiments, the CCN can implement labeled segment URIs and CCNx selector based discovery. The CCN labeled URIs define how to encode labeled parts of a hierarchical name, which are referred to herein as components. To enable the support of regular expressions, the process reserves some characters. For example, a "*" can be a special character that denotes a particular regular expression. As used herein a "*" refers to a wildcard that can be searched. Similarly, punctuation like ". or . ." can have a special meeting enabling the traversal of hierarchy of a CCN name.

In some embodiments, a CCN can be implemented in a manner that is optional using CCNx selector based discovery. Selector based discovery defines a protocol to query for content names. Special name components (or labeled segments) are added to specify parameters or variables that would match or exclude existing content names.

The embodiments of the invention overcome the limitations of the prior art. These limitations in the CCN approach can include rigid naming requirements that essentially require each CCN interest to specifically identify each content object to be retrieved. The embodiments overcome these limitations, the embodiments provide a flexible naming mechanism for identifying CCN content, using regular expressions (e.g., wildcards and similar expressions). That allow entities in the content network to perform network wide search for collections of content. The embodiments further provide a mechanism that implicitly solves the problem of one-to-many communications amongst network entities, which is needed by many applications. Example embodiments illustrating these advantages are described herein below. The embodiments demonstrate that collections of content objects can be identified using regular expressions while the associated content objects can be aggregated into a single response and caching is optimized as well.

The embodiments provide advantages over the prior art systems. The introduced naming scheme for CCN interests automatically provides a mechanism through which collections of content objects can be searched or queried. The embodiments further allows the network to be treated as a flexible data-store and simplifies the discovery and retrieval of content.

In typical networks, every device needs to be "added" explicitly into the network state: routing tables need a corresponding entry. The embodiments allow any device that publishes data into a CCN namespace to be discovered, without applications (CCN clients) knowing explicitly about it.

As use case examples, the embodiments can be deployed on a CCN network in a manner that is advantageous with respect to the following applications: The embodiments can handle massive increase in data production at the edge (huge numbers of sensors) and perform statistics and aggregation of this data at the edge as well as publish the results on the network The embodiments support monitoring and billing, querying the network for counters, in one request, and tracking router status (monitoring), and content popularity (billing). In one embodiment, the processes can be implemented using control plane functionality such as a centralized controller in an OpenFlow network. The CCN process needs to handle high-frequency operations on table entries, and wide-scale routing deletions and additions. All of these applications match the one-to-many data retrieval paradigm provided by the embodiments of the processes and structures that the CCN does not optimize natively.

The benefits include simpler code for the application, and more powerful network application programmer interface (API), such that the network performs data collection and aggregation on behalf of the application, the embodiments provide a layer of abstraction to represent lists of resources (nodes, code, data). The embodiments generate less traffic on the last mile or access network. The application sends one request to the network where the response is already consolidated data.

Basic Example

The embodiments are based on CCN's premise of using a hierarchical namespace to identify and route towards content objects in the network.

An example of a typical hierarchical name in CCN:
/path/to/my/namespace/

Such a hierarchical name, in turn, contains a set of data objects (1 . . . N):

(1) /path/to/my/namespace/object1
(2) /path/to/my/namespace/object2
( ) . . . .
(N) /path/to/my/namespace/objectN In a typical CCN setup, an entity interested in all objects under /path/to/my/namespace/ would have to explicitly be aware of the object names in that location and send 'N' CCN Interests to retrieve the N different content objects.

The embodiments provide the use of regular-expressions (e.g., wild-cards or similar search patterns) as a uniform mechanism to perform such resource-discovery and retrieval of content that can be tied in as a concept within the CCN specification.

The embodiments allow the use a CCN Interest with the query name specified as: /path/to/my/namespace/*

The embodiments encompass the use of a "Naming Layer" on top of the core CCN protocol, which intercepts CCN interest packets that contain regular-expression characters (such as '*') that may be involved with resource discovery. In order to avoid name conflicts, reserved characters and names must not be used unescaped within the network for naming any other objects.

FIG. 1 is a diagram of one embodiment of the CCN implementation for supporting regular expressions. In this example, the network representation has been simplified to show the basic flow and operation of the CCN layer. In the example, a CCN client 109 generates a set of CCN interests 111 that it forwards toward the CCN network nodes 121 that include the CCN originating device for the requested content objects. A CCN client 109 can be any type of device including a personal computer, handheld device, smartphone, console device or similar device. The CCN client 109 can request any content object in the namespace of the CCN. The requested content can be identified using a CCN name, which can include a regular expression.

The CCN interest is received at a router 101 or similar CCN node that is in communication with or a part of the CCN network 121. The router 101 implements a CCN forwarding layer 105 and a CCN naming layer 103. The CCN forwarding layer 105 looks up CCN names and determines a next hop or egress port for forwarding the CCN interest 111 toward the node hosting the data. The forwarding layer can also identify CCN interests 111 where the CCN name includes a regular expression or where the identified content object is cached by the router 101. In these cases, the CCN interest can be forwarded to the CCN naming layer 103 for further processing as is described in further detail herein below.

The CCN naming layer 103 can process the regular expression and check the local content store (i.e. local cache) or similar data structure. If the regular expression resolves to identify multiple content objects then the naming layer will generate a set of CCN interests 115 with one processed CCN interest for each of the identified content objects. If these content objects are locally cached then a CCN interest does not have to be sent out, however, if not locally cached then the CCN interest 115 is provided to the CCN forwarding layer 105 to be sent toward the originating CCN network nodes 121.

The originating CCN network nodes 121 can service the processed CCN interests 115 and return a set of CCN responses 117, with one CCN response for each requested content object. In other embodiments, the other CCN network nodes can also support aggregation and can return a CCN aggregated response with multiple content objects. The CCN naming layer 103 tracks each of the CCN interests 115 that were sent out and each of the corresponding CCN responses 117. Once all of the CCN responses 117 have been received the CCN naming layer 103 generates a CCN aggregated response 113 to be forwarded back to the CCN client 109 via the CCN forwarding layer 105.

Figure 2A:
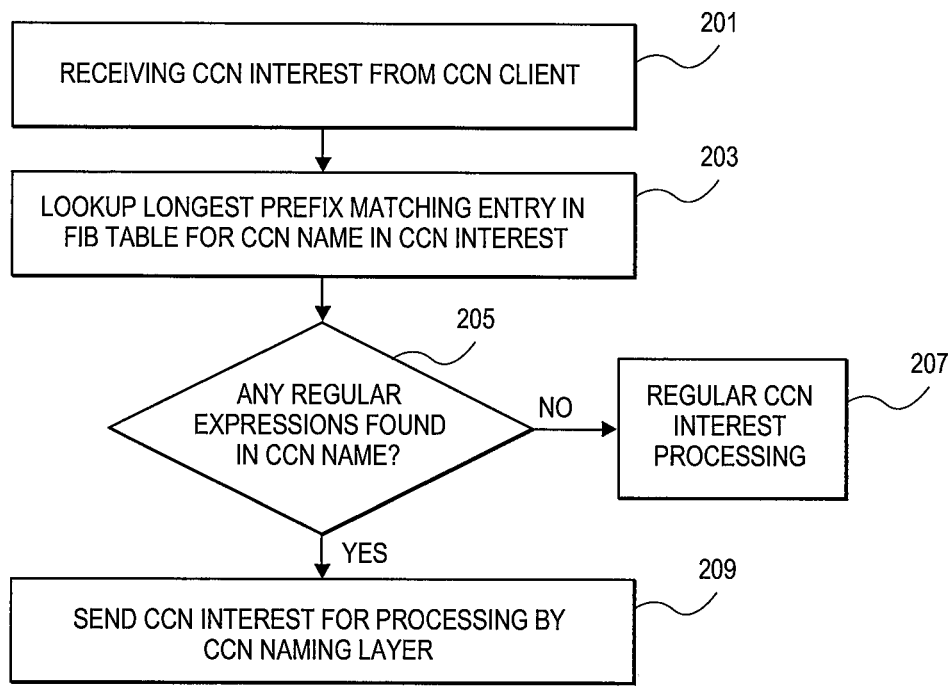
FIG. 2A is a flowchart of one embodiment of a process for handling a CCN interest including a CCN name with a regular expression by the CCN forwarding layer.

FIG. 2A is a flowchart of one embodiment of the process implemented by the CCN forwarding layer in handling a CCN interest. The primary change to the CCN forwarding layer is to extend the CCN forwarding layer to identify those CCN interests that should be further processed by the CCN naming layer. The CCN forwarding layer can receive a CCN interest from any CCN client in communication with the router or CCN node implementing the CCN forwarding layer (Block 201). The CCN forwarding layer then identifies the largest prefix matching entry in the forwarding information base (FIB) or similar routing structure for the CCN name that is in the received CCN interest (Block 203). In cases where there is no regular expression this look up will identify the single next hop or egress port for the CCN name. Where a regular expression is present a match will only be found up to the location of the regular expression in the CCN path, i.e. the prefix for this CCN name.

As used herein, a regular expression is any specialized set of characters or identifiers that describe a search pattern. These regular expressions can be special characters like '*' or "?" or similar characters and each can indicate a different search patter. Some regular expressions can indicate a wildcard or missing character type search pattern. Some regular expressions can indicate that multiple hierarchical levels can be part of the search patter (e.g., ". ." or ". . ."). Regular expressions can be used in combination with one another or separately. In one embodiment, regular expressions can be utilized in accordance with IEEE std 1003.2013 Edition, Section 9. However, regular expressions are not so limited and can include any matching language implementation.

The forwarding layer checks whether the CCN name includes any regular expressions (Block 205). Where no regular expressions are found, the standard CCN processing continues (Block 207). This can entail the basic forwarding of the CCN interest toward an originating CCN node or in some embodiments a cache lookup (i.e. content store) of the content object.

Where a regular expression is found in the CCN name, the CCN interest can be sent to the CCN naming layer for further processing (Block 209). In some embodiments, the CCN interest can be forwarded along with look up information determined for the prefix by the CCN forwarding layer and similar related data from the analysis carried out by the CCN forwarding layer.

Process steps not shown include the processing of additional CCN interests that may be generated by the CCN naming layer as well as the processing of CCN response received from other CCN nodes or CCN aggregated responses from the CCN naming layer. In each case the forwarding layer may facilitate the forwarding of these messages toward the CCN client. In each of these cases, the CCN forwarding layer looks up an egress port or next hop using the identifier of the CCN client and the FIB.

Figure 2B:
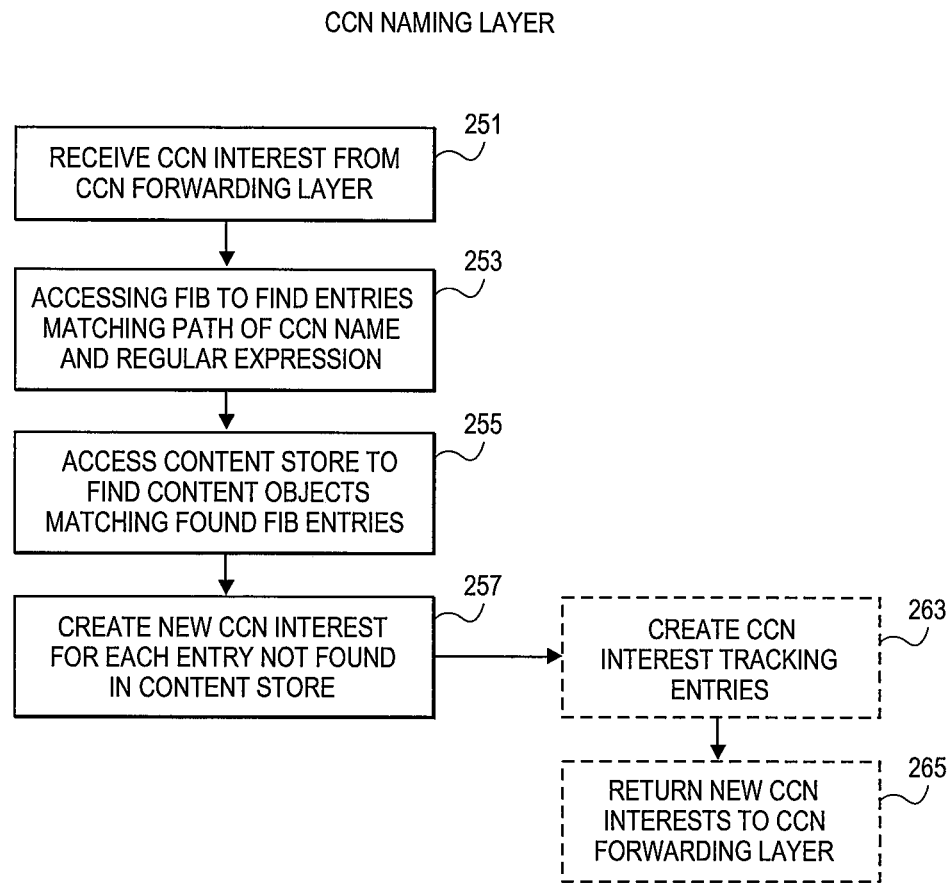
FIG. 2B is a flowchart of one embodiment of a process for handling a CCN interest including a CCN name with a regular expression by the CCN naming layer.

FIG. 2B is a flowchart of one embodiment of a process implemented by the CCN naming layer to handle regular expressions in CCN names of received CCN interests. The process begins with receiving a CCN interest containing a regular expression from the CCN forwarding layer (Block 251).

The FIB is accessed to find entries that match the path name and the regular expression (Block 253). The regular expression can be expanded to determine all possible values that match the search patter of the regular expression in combination with the CCN name (i.e. the prefix or remainder of the name). For each FIB entry that is found a check is made whether the corresponding content object is already cached at the CCN node. The content store is searched to find each content object that matches an FIB entry that was found to match the CCN name and regular expression combination (Block 255). In some embodiments the search of the content store is optional. If a content store is not present in the CCN node implementing the process, then the content store search for the content object is not performed. A CCN interest is generated and forwarded to the originating CCN nodes or set of nodes to obtain those content objects that are not locally cached in the content store (Block 257). As each CCN interest is received by the naming layer and new CCN interests are generated a set of tracking entries can be created to track the state of each corresponding content object being retrieved (Block 263). A tracking entry can be generated for each matching FIB entry and a corresponding set of entries for each of the content objects to be retrieved. Example implementations are discussed further herein below with regard to FIGS. 4 and 5. Once all of the content objects matching the search pattern of the regular expression have been found, then the content objects are aggregated and returned by a CCN aggregated response to the CCN client that generated the CCN interest (Block 265).

Figure 3:
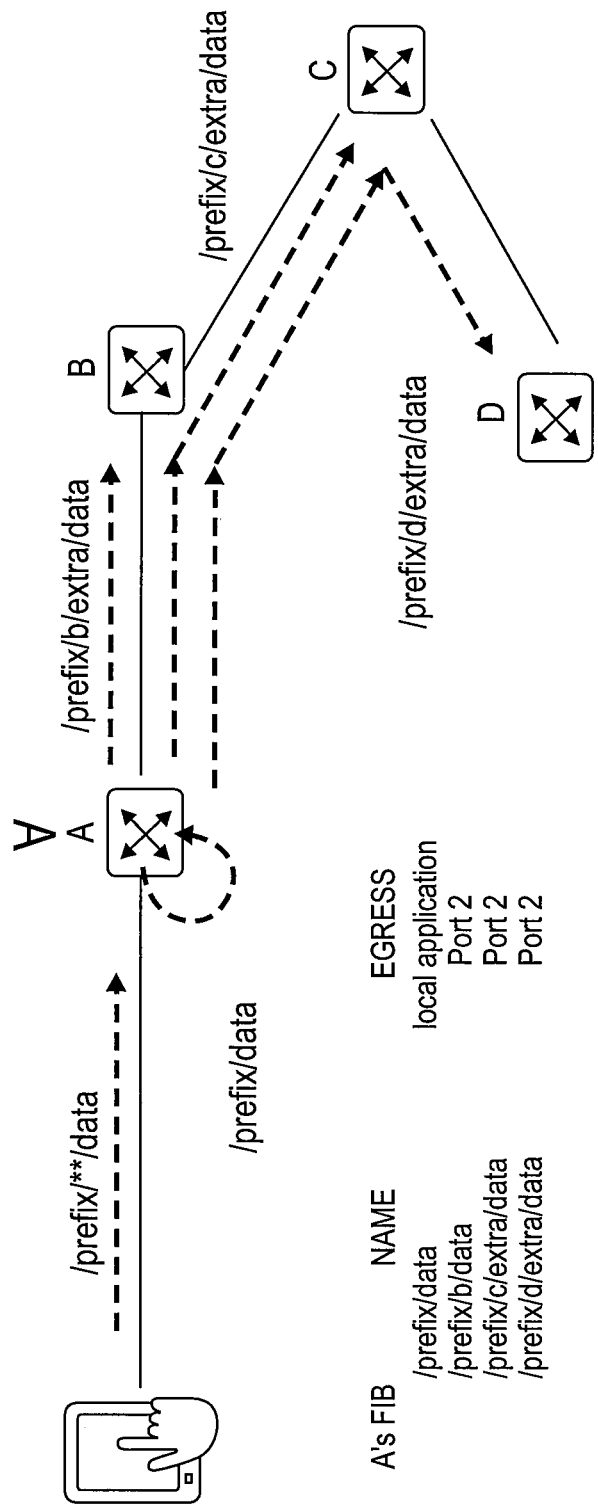
FIG. 3 is a diagram of an example CCN including a CCN client and a set of CCN nodes.

FIG. 3 is a diagram of one example CCN network demonstrating globstar pattern hierarchy handling. In the example, a CCN client (e.g., a handheld device) generates a CCN interest with a CCN name /prefix//data. This is processed at router A. The CCN interest contains the regular expression  and is flagged to be processed by the CCN naming layer. At the CCN naming layer the regular expression **, which is a globstar pattern, is expanded and treated like a 'ForAll' operator that generates four new CCN interests (including one for itself) based on the matches in the FIB (as illustrated). The CCN interests include CCN interests for each of the end CCN nodes [A, B, C, and D]. Separate CCN interests are sent to each of these nodes and each in turn returns a content object. These returned content objects are aggregated and sent as a CCN aggregate response to the CCN client that generated the request with the original regular expression.

CCN Interest Tracking and Caching

As set forth above, the generation of additional CCN interests based on regular expressions requires tracking the status of each of the CCN interests so that the resulting content objects that are returned for each generated CCN interest can be aggregated and returned to the requesting CCN client. Any data structure or system can be utilized to effect this tracking. A system of using a pending regular expression table (PRIT) and a set of pending expanded interest tables (PEITs) is described herein below by way of example and not of limitation. One skilled in the art would understand that other data structures and tracking schemes are also compatible with the handling of regular expressions as set forth herein.

In one embodiment, the CCN naming layer maintains a PRIT, which is similar to a pending interest table (PIT) that is maintained by the CCN forwarding layer. The PRIT includes an entry for each CCN interest that is currently being processed or is incomplete in its processing. For each PRIT entry, the CCN naming layer maintains a set of expanded CCN interests that were generated in corresponding PEITs.

Figure 4:
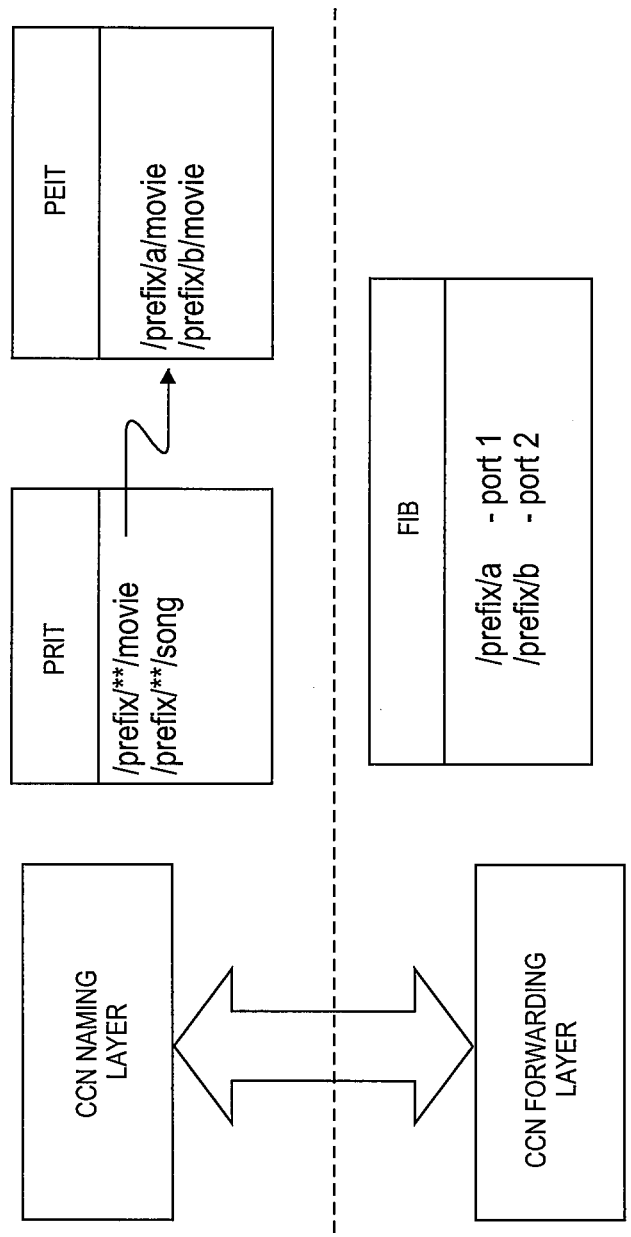
FIG. 4 is a diagram of one embodiment of a set of tracking tables for monitoring and aggregating content objects.

FIG. 4 is a diagram of one example of the data structures maintained by the CCN naming layer and the CCN forwarding layer. The CCN naming layer maintains a PRIT with a list of the CCN names of each CCN interest that is currently being handled by the CCN naming layer. In the example, two CCN names are in process (1) /prefix//movie and (2) /prefix//song. A PEIT is maintained for each of these entries, for sake of clarity only one of the PEITs is illustrated. The illustrated PEIT shows two CCN interests that were generated using the data from the FIB maintained by the CCN forwarding layer. In this example, the wildcard ** in the first PRIT entry resolved to a and b resulting in two CCN interests (1) /path/a/movie and (2) /path/b/movie.

Figure 5:
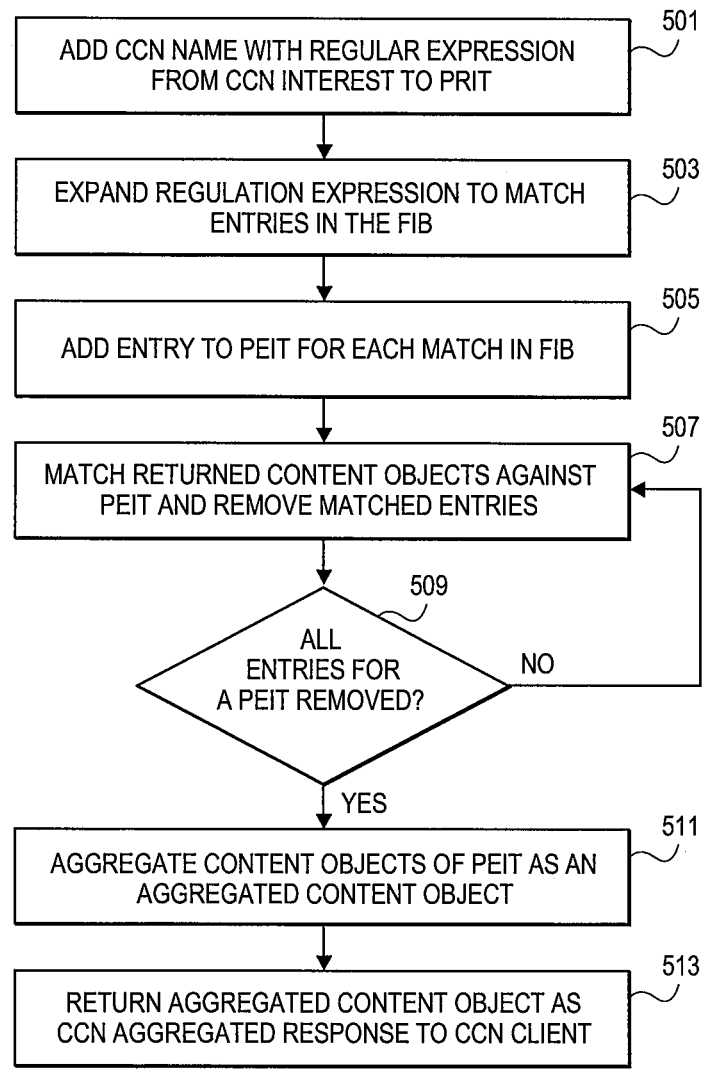
FIG. 5 is a diagram of one embodiment of a process for CCN naming layer aggregation.

FIG. 5 is a flowchart of one embodiment of the process for maintaining the tracking data structures. This tracking process enables the aggregation of the CCN responses. In one embodiment, the process begins with the processing of a regular expression by the CCN naming layer. A CCN name with a regular expression is added to the PRIT (Block 501). The regular expression is then analyzed to expand into separate concrete CCN names by accessing and matching the regular expression against the entries in the FIB (Block 503). For each matched entry in the FIB an entry is created in the PEIT corresponding to the PRIT entry (Block 505). The local content store can be checked to determine if the content object is available in the CCN node, if not, then corresponding CCN interests are then sent out to their destination CCN nodes by the CCN forwarding layer and the CCN responses begin to be received. If the content objects were found in the local content store, then the PEIT entries can be removed.

For each CCN interest and a corresponding CCN response is expected, as the CCN responses are received they are matched against the PRIT and PEIT entries and the PEIT entries are removed as each corresponding CCN response is received (Block 507). A check is made at each removal to determine whether all of the PEITs have been removed for a given PRIT entry (Block 509).

When all of the PEITs have been removed, then the process is ready to aggregate the content objects received in each of the CCN responses of these PEITs for the PRIT entry (Block 511). This aggregated content object is then returned to the CCN forwarding layer or a CCN aggregated response is generated for the aggregated content object by the CCN naming layer and the CCN aggregated response is forwarded to the CCN client that initiated the CCN interest (Block 513)

Examples of CCN Names with Regular Expressions

The following is a set of example CCN names with regular expressions to illustrate the variety and flexibility that regular expressions can provide to the CCN.

(1) /esv/buildings/200/temperature/*

The name indicates to fetch all objects named temperature that are currently published for building 200 in the Ericsson Silicon Valley site.

(2) /esv/buildings/*/temperature/*

Fetch all temperature readings for all buildings.

(3) /esv/buildings/1??/temperature/*

Fetch all temperature readings for buildings numbered 100-199 (standard regular expression matching for wildcard ?).

(4) /esv/buildings/**

Fetch all sensor data for all buildings.

These examples show how simple queries can uniformly retrieve collections of data from a CCN network. This has powerful applications in many facets of one-to-many data sources allowing programming to be simplified. Further, queries can also be cached into the network allowing multiple monitoring entities to re-use the data (many-to-many communication).

Caching Rules

In this section, the embodiments describe caching rules relevant to CCN that can be implemented by the CCN naming layer when generating CCN responses. These rules help ensure efficiency and coherency in the caching process.

(1) A CCN node can cache locally an CCN aggregated response only if that node performed the aggregation itself, and the aggregated regular expression generated is the last component in the queried CCN name (e.g., /path/to/* would be positive, /path/to/*/more would be negative).

(2) A cached regular expression CCN response must be invalidated whenever a FIB modification (i.e. add, delete, modify FIB entry) impacts an entry that matches the regular expression.

An example:

(a) A cached response for /path/to/* is comprised of objects:

/path/to/A
/path/to/B
The router's FIB is updated to add:
/path/to/C

The CCN node must now invalidate the cache entry for /path/to/*, because /path/to/C should now be added to the collection of /path/to/* CCN interests. The invalidation allows the re-generation of a new, up-to-date CCN responses when a new CCN interest is received by the CCN node.

Relaxed Caching

The caching rules described herein above can limit which content objects can be cached. These restrictions are a necessary condition to prevent stale regular expression content from being kept in the network.

One alternative embodiment, is to implement mechanisms for cache invalidation and maintenance in CCN. However, this would require complex state tracking and cache synchronization between CCN routers, which would be contrary to the spirit of CCN. Instead, the embodiments provide that in case of controlled environments (e.g. a private sensor network), it is possible to overcome the caching limitations with more expressive names.

CCN, through the optional Labeled Segment URIs specification, allows the use of qualifiers in content names, e.g., /path/to/something/location=X/attribute=Y. By applying this idea to regular expression names, it is possible to prove a way to specify cache freshness. For example:

/ericsson/buildings/*[elapsed=5]/rooms/*/temperature

The [elapsed] attribute can signify to the CCN node that is expanding the first regular expression (the first * here) that the original CCN interest sender will accept responses cached within the last 5 seconds.

In this example case, per-building temperature readings can be stored in caches, even if per-room readings have changed in the meantime. The per-building cached value will expire according to router-local policy, just like in typical CCN operation.

Aggregated CCN Response Object

With one-to-many communication, the typical workflow provides:

(1) A CCN client wants data from a collection of N Sources. It sends a single request (CCN interest) to the CCN network that includes a regular expression.

(2) The CCN node in the CCN network expands the regular expression using the rules described herein above. More precisely, the CCN router able to expand the first regular expression encountered in the content name will do the expansion. N CCN interests are generated.

(3) N content objects (or timeouts) are received by the aforementioned router. That CCN router aggregates the results into a single aggregated content object packet, with the regular expression name from step 1.

(4) The regular expression content object is sent back to the CCN client from step 1.

Note that steps 2-4 can be recursive, if the content name contains multiple regular expressions.

The content object aggregation from step 3 can be performed as follows. A simple solution, using the CCN type length value (TLV) wire format, is to lay down each content object packet (without the CCN header) as a sequence. Note that these payloads are already TLVs themselves Aggregating lots of responses into a single packet might exceed the MTU of the underlying protocol. This would trigger packet fragmentation, which is already supported by CCN. One skilled in the art would understand that the actual packing of these content objects can be done in numerous ways, as long as the CCN client understands the format.

Figure 6:
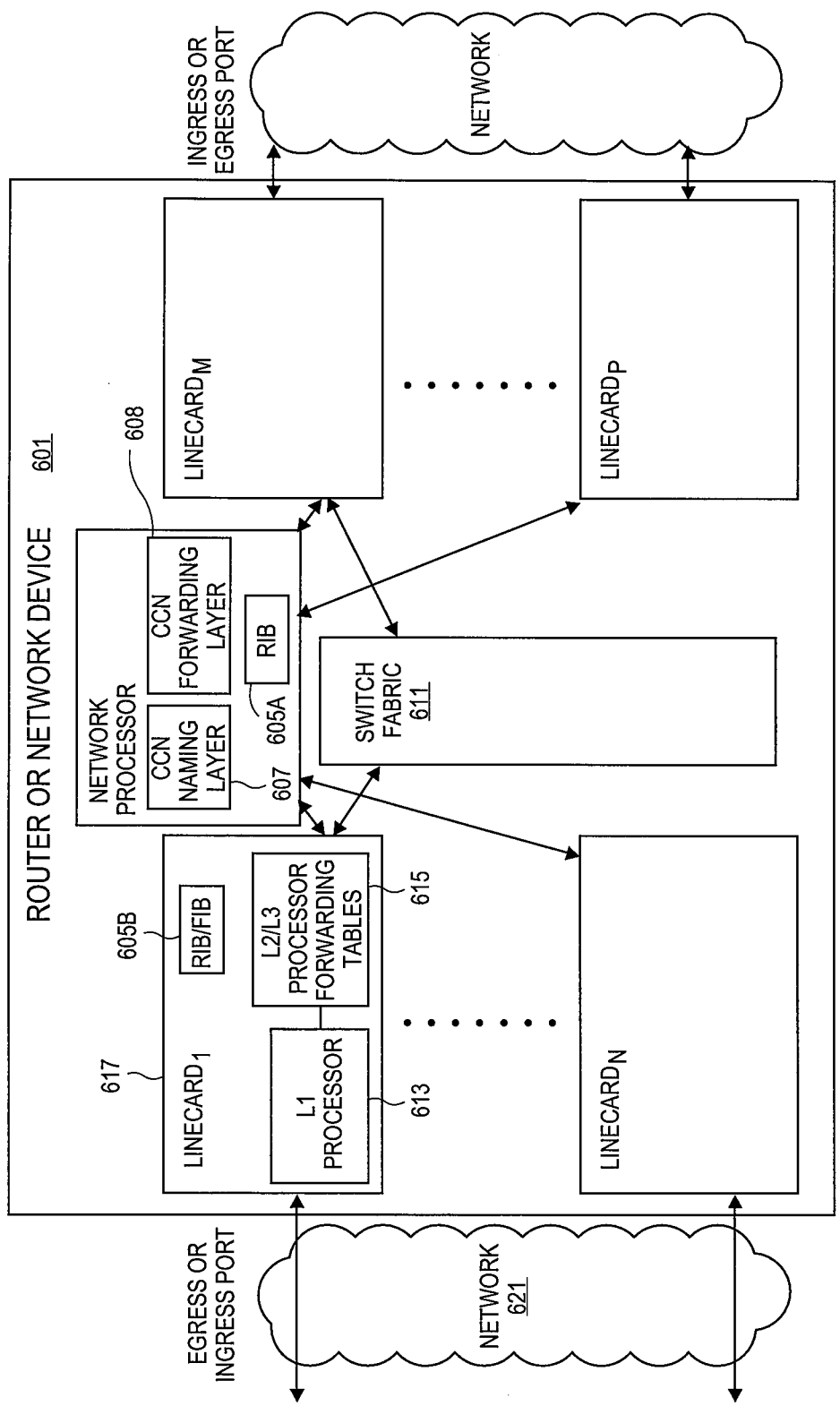
FIG. 6 is a diagram of one embodiment a network device (ND) implementing an asynchronous BFD session with support for explicit return paths.

FIG. 6 is a diagram of one embodiment of a network device implementing a CCN node or CCN router. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 601 or network device or similar computing device. The router 601 can have any structure that enables it to receive data traffic and forward it toward its destination. The router 601 can include a network processor 603 or set of network processors that execute the functions of the router 601. A 'set,' as used herein, is any positive whole number of items including one item. The router 601 or network element can execute a CCN forwarding layer 608 and CCN naming layer 607 as described herein above via a network processor 603 or other components of the router 601. The network processor 603 can implement the CCN forwarding layer 608 and CCN naming layer 607 is discrete hardware, software module or any combination thereof. The network processor 603 can also service the routing information base 605A and similar functions related to data traffic forwarding and network topology maintenance. The functions of the CCN forwarding layer 608 and CCN naming layer 607 can be implemented as modules in any combination of software, including firmware, and hardware within the router. The functions of the CCN naming layer 607 and CCN forwarding layer 608 are executed and implemented by the router 601 include those described further herein above.

In one embodiment, the router 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the forwarding information base 605B, or a relevant subset thereof. The line cards 617 can also implement or facilitate the CCN naming layer and CCN forwarding layer functions described herein above. The line cards 617 are in communication with one another via a switch fabric 611 and communicate with other nodes over attached networks 621 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 7A, 7B:
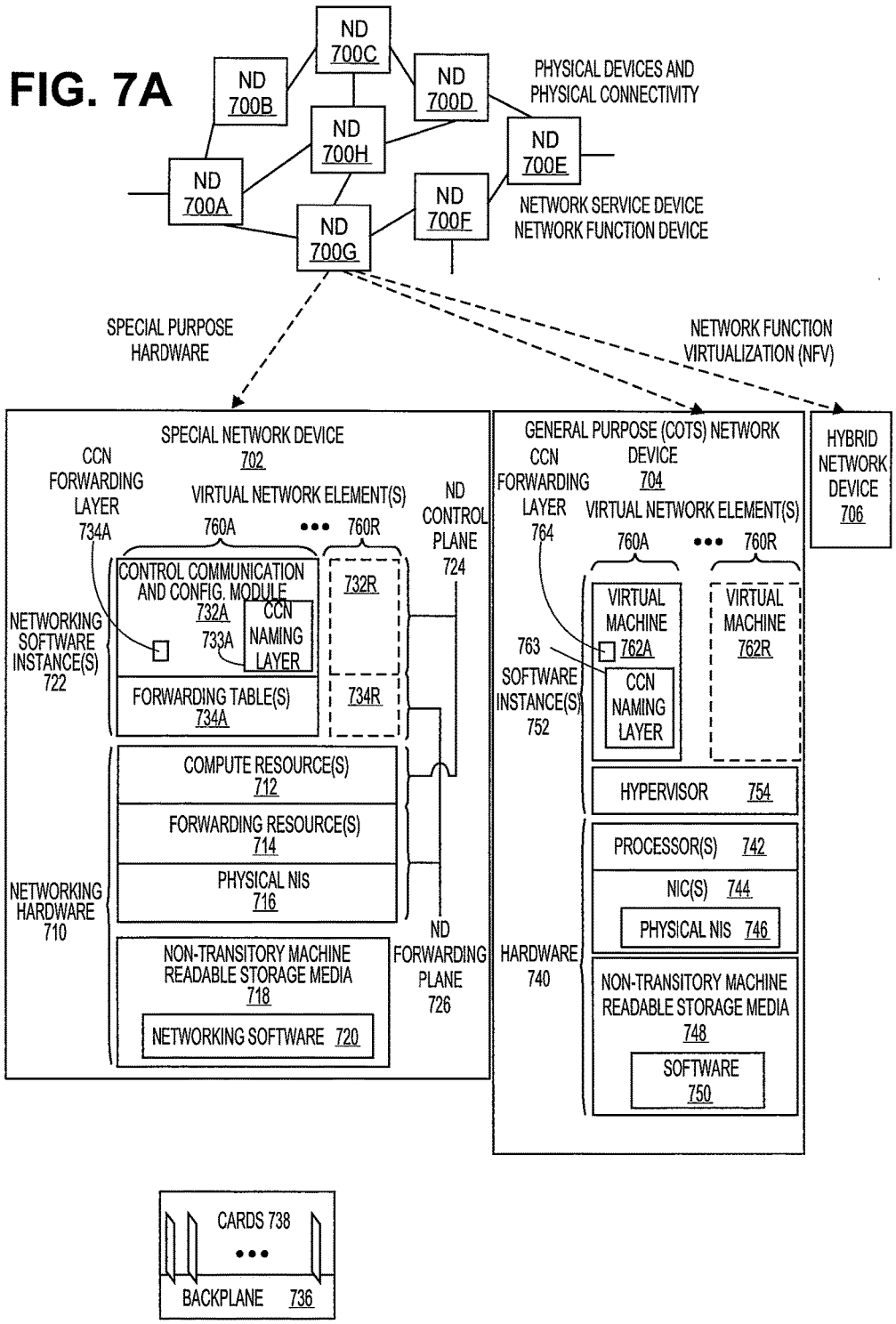
FIG. 7A illustrates connectivity between network devices (NDs) within an exemplary network, as well as three exemplary implementations of the NDs, according to some embodiments of the invention.
FIG. 7B illustrates an exemplary way to implement the special-purpose network device 402 according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). In some embodiments, the control communication and configuration module 732A encompasses the CCN naming layer 733A and CCN forwarding layer 734A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 416 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R. In some embodiments, the virtual machine module 762A encompasses CCN naming layer 763 and CCN forwarding layer 764.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 4C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach). In some embodiments, the centralized reachability and forwarding module 779 encompasses CCN naming layer and CCN forwarding layer functions in corresponding CCN naming layer module 781 and CCN forwarding module 782 that implement CCN functionality as described herein above including support for regular expressions.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 404 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 478 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
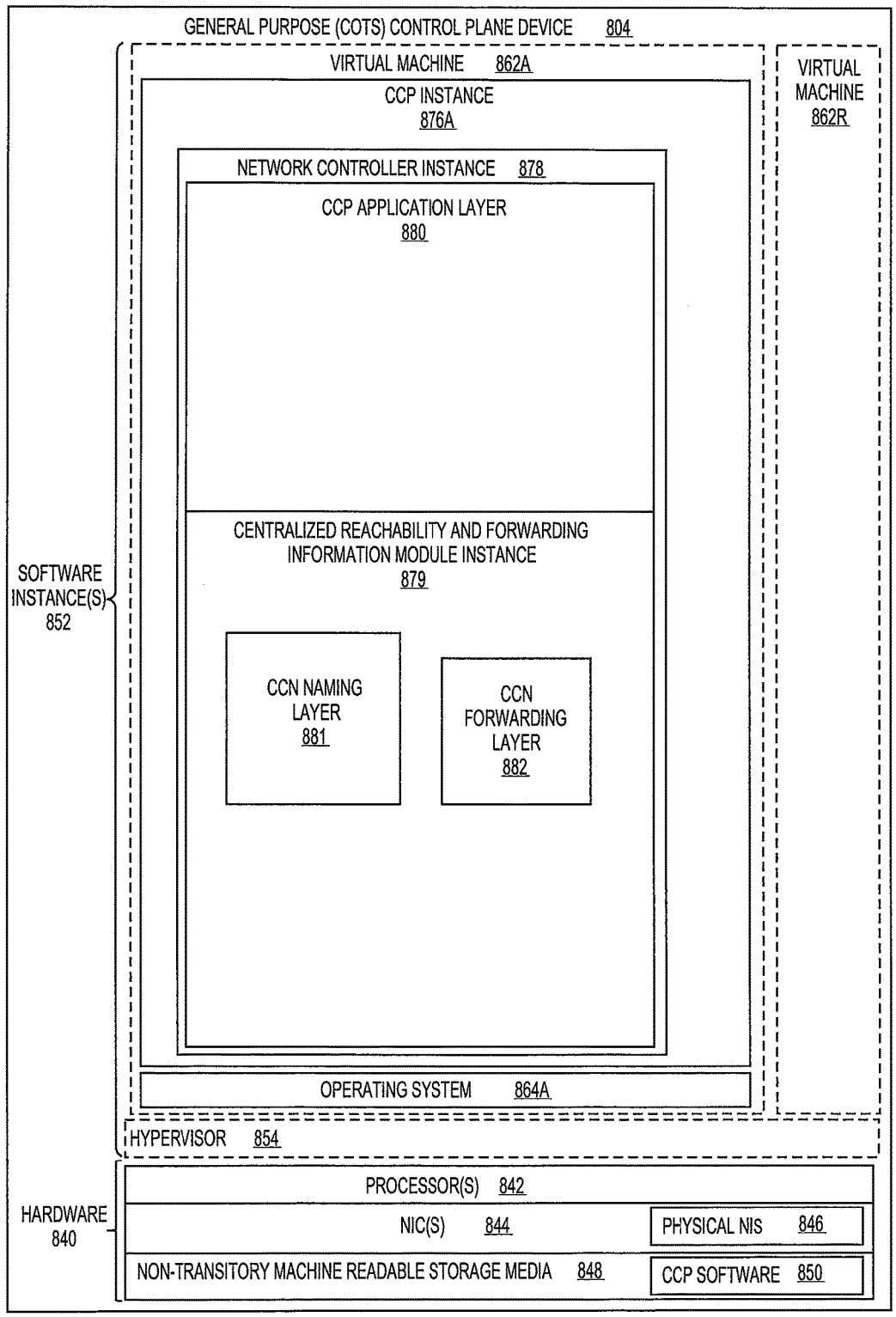
FIG. 8 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 878 to the operating system 864A and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view. The CCP application can encompass the functionality of the CCN naming layer 881 and the CCN forwarding layer 882—as described herein above.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a content centric network (CCN) naming layer executed by a network device, the naming layer configured to enable processing of regular expressions as part of a hierarchical CCN name, Where regular expressions are sequences of characters that form a search pattern, the method to process regular expressions utilized in a one to many scenario between a plurality of CCN clients and at least one CCN serving node, the method comprising the steps of:
   receiving a CCN interest from a CCN forwarding layer, the CCN interest including a first CCN name and a regular expression;
   accessing a forwarding information base (FIB) to find FIB entries matching a path of the CCN name and the regular expression;
   accessing a content store to find content objects matching the FIB entries; and
   creating a new CCN interest for each of the FIB entries not found in the content store;
   creating tracking entries in a table for each new CCN interest;
   adding the CCN name with the regular expression from the CCN interest to a pending regular expression interest table (PRIT); expanding the regular expression to match entries in the FIB; adding an entry to pending expandable interests table (PEIT) for each match in the FIB;
   matching returned content objects against the PEIT and removing matched entries,
   aggregating content objects of the PEIT as an aggregated content object, in response to all entries for the PEIT being removed; and returning the aggregated content object as a CCN aggregated response to the CCN client.

2. The method of claim 1, further comprising the step of: returning each new CCN interest to the CCN forwarding layer to be forwarded to nodes of the CCN.

3. The method of claim 2, further comprising the step of: aggregating content objects to be returned to the CCN forwarding layer.

4. A network device to execute a method for enabling processing of regular expressions as part of a hierarchical CCN name, where regular expressions are sequences of characters that form a search pattern, the method to process regular expressions utilized in a one to many scenario between a plurality of CCN clients and at least one CCN serving node, the network device comprising:

a non-transitory machine-readable storage medium configured to store a CCN forwarding layer and a CCN naming layer; and a network processor communicatively coupled to the non-transitory machine-readable storage medium, the network processor configured to execute the CCN forwarding layer and the CCN naming layer, the CCN Naming layer configured to receive a CCN interest from the CCN forwarding layer, the CCN interest including a CCN name and regular expression, to access a forwarding information base (FIB) to find FIB entries matching a path of the CCN name and the regular expression, to access a content store to find content objects matching the FIB entries, and to create a new CCN interest for each of the FIB entries not found in the content store, wherein the CCN naming layer is further configured to add the CCN name with the regular expression from the CCN interest to a pending regular expression interest table (PRIT), to expand the regular expression to match entries in the FIB, to add an entry to pending expandable interests table (PEIT) for each match in the FIB, to match returned content objects against the PEIT and remove matched entries, to aggregate content objects of the PEIT as an aggregated content object, in response to all entries for the PEIT being removed, and to return the aggregated content object as a CCN aggregated response to the CCN client.

5. The network device of claim 4, wherein the CCN naming layer is further configured to create tracking entries in a table for each new CCN interest.

6. The network device of claim 5, wherein the CCN naming layer is further configured to return each new CCN interest to the CCN forwarding layer to be forwarded to nodes of the CCN.

7. The network device of claim 6, wherein the CCN naming layer is further configured to aggregate content objects to be returned to the CCN forwarding layer.

8. A computing device executing a plurality of virtual machines for implementing network function virtualization (NFV), wherein a virtual machine from the plurality of virtual machines is configured to execute a method for enabling processing of regular expressions as part of a hierarchical CCN name, where regular expressions are sequences of characters that form a search pattern, the method to process regular expressions utilized in a one to many scenario between a plurality of CCN clients and at least one CCN serving node, the computing device comprising:

a non-transitory machine-readable storage medium configured to store a CCN forwarding layer and a CCN naming layer; and a processor communicatively coupled to the non-transitory machine-readable storage medium, the processor configured to execute the CCN forwarding layer and the CCN naming layer, the CCN Naming layer configured to receive a CCN interest from the CCN forwarding layer, the CCN interest including a CCN name and regular expression, to access a forwarding information base (FIB) to find FIB entries matching a path of the CCN name and the regular expression, to access a content store to find content objects matching the FIB entries, and to create a new CCN interest for each of the FIB entries not found in the content store, wherein the CCN naming layer is further configured to add the CCN name with the regular expression from the CCN interest to a pending regular expression interest table (PRIT), to expand the regular expression to match entries in the FIB, to add an entry to pending expandable interests table (PEIT) for each match in the FIB, to match returned content objects against the PEIT and remove matched entries, to aggregate content objects of the PEIT as an aggregated content object, in response to all entries for the PEIT being removed, and to return the aggregated. content object as a CCN aggregated response to the CCN client.

9. The computing device of claim 8, wherein the CCN naming layer is further configured to create tracking entries in a table for each new CCN interest.

10. The computing device of claim 9, wherein the CCN naming layer is further configured to return each new CCN interest to the CCN forwarding layer to be forwarded to nodes of the CCN.

11. The computing device of claim 10, wherein the CCN naming layer is further configured to aggregate content objects to be returned to the CCN forwarding layer.

12. A control plane device configured to implement at least one centralized control plane for a software defined network (SDN), the centralized control plane configured to execute a method for enabling processing of regular expressions as part of a hierarchical CCN name, where regular expressions are sequences of characters that form a search pattern, the method to process regular expressions utilized in a one to many scenario between a plurality of CCN clients and at least one CCN serving node, the control plane device comprising:

a non-transitory machine-readable storage medium configured to store a CCN forwarding layer and a CCN naming layer; and a processor communicatively coupled to the non-transitory machine-readable storage medium, the processor configured to execute the CCN forwarding layer and the CCN naming layer, the CCN Naming layer configured to receive a CCN interest from the CCN forwarding layer, the CCN interest including a CCN name and regular expression, to access a forwarding information base (FIB) to find FIB entries matching a path of the CCN name and the regular expression, to access a content store to find content objects matching the FIB entries, and to create a new CCN interest for each of the FIB entries not found in the content store, wherein the CCN naming layer is further configured to add the CCN name with the regular expression from the CCN interest to a pending regular expression interest table (PRIT), to expand the regular expression to match entries in the FIB, to add an entry to pending: expandable interests table (PEIT) for each match in the FIB, to match returned content objects against the PEIT and remove matched entries, to aggregate content objects of the PEIT as an aggregated content object, in response to all entries for the PEIT being removed, and to return the aggregated content object as a CCN aggregated response to the CCN client.

13. The control plane device of claim 12, wherein the CCN naming layer is further configured to create tracking entries in a table for each new CCN interest.

14. The control plane device of claim 13, wherein the CCN naming layer is further configured to return each new CCN interest to the CCN forwarding layer to be forwarded to nodes of the CCN.

15. The control plane device of claim 14, wherein the CCN naming layer is further configured to aggregate content objects to be returned to the CCN forwarding layer.

* * * * *